Sept. 26, 1967    E. HARVITH    3,343,682
COFFEE FILTER ELEMENT
Filed Oct. 12, 1966

INVENTOR.
ERWIN HARVITH
BY
HAUKE, KRASS & GIFFORD
ATTORNEYS

United States Patent Office 3,343,682
Patented Sept. 26, 1967

3,343,682
COFFEE FILTER ELEMENT
Erwin Harvith, Southfield, Mich., assignor to Star Filter Company, Detroit, Mich., a corporation of Michigan
Filed Oct. 12, 1966, Ser. No. 586,264
4 Claims. (Cl. 210—477)

ABSTRACT OF THE DISCLOSURE

A coffee filter for insertion in a basket or perforated cup of coffee-making apparatus for removing the fine grounds which would normally pass through the basket and including a central arcuate slit to permit the filter to be inserted over the central stem of a percolator or to lie flat on the bottom of the basket when used in a dripulator and in which the filter also includes a peripheral tear strip so that it will accommodate different sizes of baskets.

This application is a continuation-in-part of application Ser. No. 300,947, filed Aug. 8, 1963, now abandoned.

This invention relates to filters for coffee makers, and more particularly to a disposable filter having a peripheral tear strip adapted to selectively reduce the diameter of the filter to accommodate any standard size ground coffee basket.

Coffee making apparatus normally comprises a perforated cup or basket in which a filter element is placed. Ground coffee beans are disposed in the basket on top of the filter element and means provided to cause heated water to spill over onto the coffee. As the water trickles through the loose coffee grounds, it absorbs the flavor and strength of the coffee beans. The filter element is normally formed of a paper or tissue material adapted to remove the fine grounds or dregs which would normally pass through the perforations in the ground coffee containing basket in the absence of the filter.

A problem associated with conventional coffee filters, is that coffee percolators in common usage, depending on their capacity, normally employ a variety of sizes of coffee baskets. Thus, the retailer is required to maintain an inventory of coffee filters to accommodate different sizes of percolators. In addition, a consumer having coffee percolators of two different sizes is required to maintain a stock of two different sizes of coffee filters.

It is the broad purpose of the present invention to provide a coffee filter sheet which may be adapted to accommodate any standard size coffee ground basket. In a preferred embodiment of the present invention, which will be subsequently described in detail, the filter sheet is formed of filter material and provided with a series of circular patterns having a common diameter with each pattern corresponding to a standard size coffee basket. Each circular pattern is defined by a series of incisions formed in the filter material and adapted to permit separation of the circumferential edge of the filter sheet so that the diameter of the element is reduced to the desired size. Thus, one size filter sheet can be adapted to accommodate any standard size ground coffee basket thereby reducing the varieties of sizes of coffee filters which must be maintained by the retailer and the consumer.

There are two different types of coffee making apparatus in common usage, including the percolator type which employs a perforated basket having a hollow stem extending therethrough for the delivery of heated water which spills over the ground coffee. A second type of coffee maker is the dripulator, which employs a perforated basket and means for pouring the water over the ground coffee without utilizing a hollow stem.

It is another purpose of the present invention to provide a single filter which in addition to accommodating any standard size of coffee basket can be used with either of the above common type coffee makers. The preferred embodiment of the invention employs a centrally disposed incision which will permit a stem to be slipped therethrough or remain seated in the plane of the filter if a stem is not utilized. Preferably the centrally disposed incision takes the form of an arcuate incision having a diameter closely corresponding to the diameter of the stem so that when the filter element is slipped over the stem, the filter forms a sung fit thus preventing the grounds from slipping through with the dripping water. Another form of the centrally disposed slit to accommodate the hollow stem takes the form of a pair of mutually perpendicular incisions, which permit the filter to be inserted over the end of the stem. Although the perpendicular incisions are of a more conventional configuration, the arcuate incision provides special advantages over the conventional configuration in that there is little tendency for the incision to tear radially outwardly; thus, enlarging the central opening and permitting the grounds to slip through around the hollow stem.

It is therefore an object of the present invention to provide a single size filter sheet which is provided with a plurality of circular patterns perforated to permit the filter sheet to be reduced to a size corresponding to the diameter of any standard coffee ground basket.

It is another object of the present invention to provide such a filter having an extremely simple design and low manufacturing costs.

It is still another object to the present invention to provide such a filter which may be utilized in coffee making apparatus employing a basket either with or without a centrally disposed hollow stem extending therethrough.

Still, other objects and advantages of the present invention will be fully apparent from the following detailed description wherein the preferred embodiment of the invention is set forth. The invention makes reference to the accompanying drawings in which.

Figure 1:
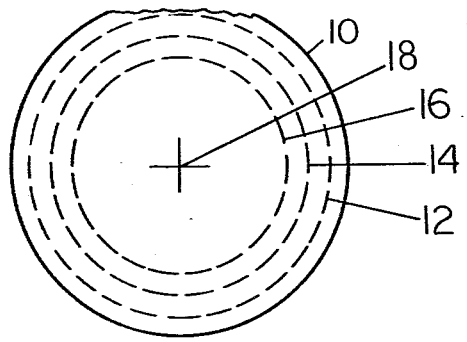
FIGURE 1 is a plan view of the preferred filter element embodying the invention.
Figure 2:
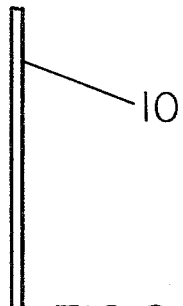
FIGURE 2 is a side elevation view of the element illustrated in FIGURE 1.

Now referring to the drawings, FIGURES 1 and 2 illustrate a preferred embodiment of the present invention as comprising a filter sheet 10 formed of conventional filter material, such as tissue. The filter sheet 10 preferably has a circular configuration and includes three circular patterns 12, 14, and 16; each having a decreasing diameter and formed about a common center. Each of the patterns is preferably defined by a series of spaced incisions to form a circumferential tear strip. Preferably each of the patterns correspond to the diameter of a conventional coffee filter basket. Thus, for instance, pattern 16 might have a diameter of three inches, pattern 14, a diameter of three and one half inches, and pattern 12, a diameter of four inches, and the overall diameter of the filter sheet having a magnitude of four and one half inches.

As can best be seen in FIGURE 2, the filter sheet 10 is adapted to accommodate a selected basket size by tearing the peripheral edge of the filter sheet along a pattern size corresponding to the selected basket. It is to be understood, of course, that the incisions of the unseparated patterns are such that they do not permit the coffee grounds to trickle through but perform a full filtering function.

It will be noted that in FIGURE 1, the element 10 is provided with a pair of centrally disposed, narrow, perpendicular slits 18. FIGURE 2 illustrates an alternative embodiment of the invention including a filter element 20 having circular patterns 22, 24 and 26. This embodiment differs from that shown in FIGURE 1 in that a centrally disposed arcuate slit 28 is employed. The slit 28 is preferably formed through about 300° of a circle and the remaining 60° is left unformed. When used with a dripulator, the tab thus formed remains seated to form a unitary part of the filter.

Figure 3:
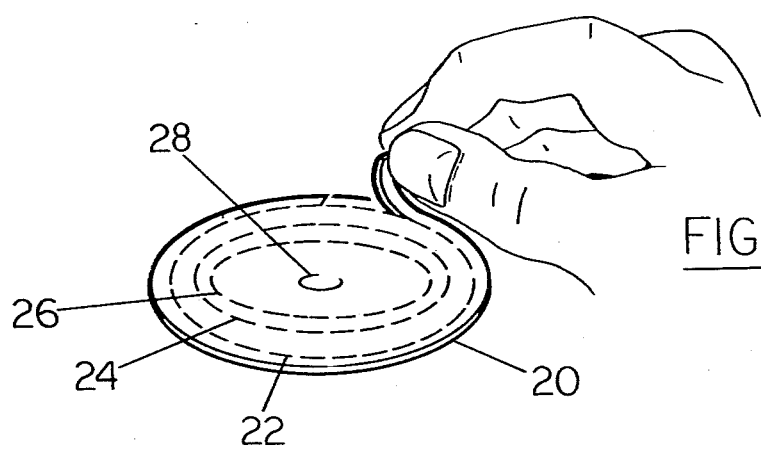
FIGURE 3 is a perspective view of the element illustrated in FIGURE 1 and showing how the element may be reduced to a select size.
Figure 4:
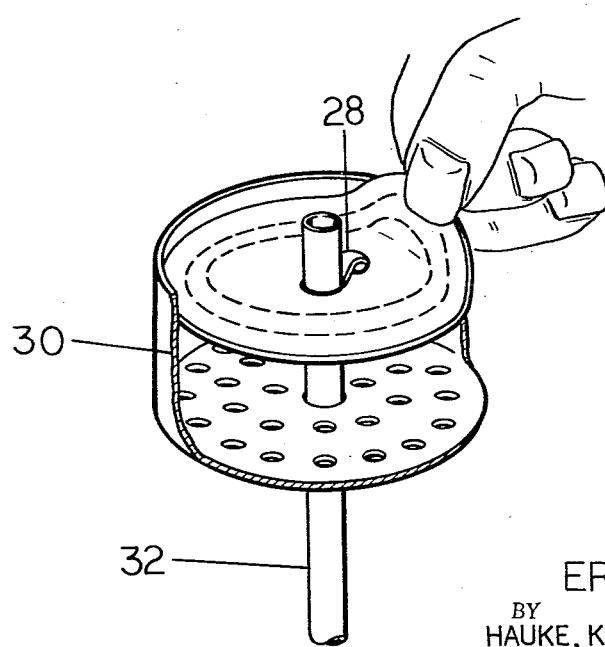
FIGURE 4 is a perspective view of the element of the reduced element being inserted in the basket of a coffee brewing apparatus.

FIGURE 4 illustrates a basket 30 employed in a percolator-type coffee making apparatus which utilizes a hollow vertical stem 32 extending upwardly through the basket to direct heated water which is delivered over the grounds contained within the basket. The filter element 20 illustrated in FIGURE 3 has its size reduced by removing the circumferential edge so that its diameter corresponds to the interior diameter of the basket 30. The filter element is then pushed over the upper end of the stem 24, so that the flap of the arcuate incision 28 forms a circular opening. The filter is pushed downwardly along the stem 24 until it overlays the horizontal perforated bottom of the basket 30. The ground coffee beans are then placed in the basket over the filter and the coffee brewed in the conventional manner. After brewing, the filter is discarded with the coffee grounds.

Since the filter 20 fits closely about the sides of the hollow stem 32, the coffee grounds are prevented from passing through.

Having thus described my invention, I claim:

1. A filter element useful in combination with the ground coffee holding basket of coffee making apparatus including coffee percolators having a tubular section extending through the basket and coffee dripulators which do not have a tubular section extending through the basket, said filter element comprising:
   (a) a planar section of a fluid pervious material having a perimeter corresponding to the lower portion of the ground coffee holding basket; and
   (b) a centrally formed incision provided in said planar section, said incision having an arcuate configuration with a diameter generally corresponding to the diameter of the tubular section, so that said filter element may be laid on the bottom of a coffe dripulator basket to substantially cover the entire area thereof, and may also be laid in a coffee percolator with the tubular section extending through the arcuate incision so that the edges of the incision intimately contact the outer surface of the tubular section.

2. A filter element as defined in claim 1, wherein said planar section has a circular configuration, and all points of the centrally disposed incision are equidistant from the perimeter of said section.

3. A filter element useful in combination with the ground coffee holding basket of coffee making apparatus including coffee percolators having a tubular section extending through the basket and coffee dripulators which do not have a tubular section extending through the basket, said filter element comprising:
   (a) a sheet of a fluid pervious material having a planar section with a perimeter substantially corresponding to the lower portion of the ground holding basket, and
   (b) a centrally formed incision provided in said planar section, said incision having an arcuate configuration with a diameter generally corresponding to the diameter of the tubular section, so that said filter element may be laid on the bottom of a coffee dripulator basket to substantially cover the entire area thereof, and may also be laid in a coffee percolator with the tubular section extending through the arcuate incision so that the edges of the incision intimately contact the outer surface of the tubular section.

4. The filter element as defined in claim 3 and in which said incision extends only part way through a circle to leave a portion thereof uncut.

References Cited

UNITED STATES PATENTS

| | | | |
|---|---|---|---|
| 1,767,544 | 6/1930 | Miller | 210—477 X |
| 2,889,049 | 6/1959 | Hauser | 210—477 X |
| 2,948,212 | 8/1960 | Sisselman et al. | 99—310 |
| 3,250,398 | 5/1966 | Adiletta | 210—477 X |

REUBEN FRIEDMAN, *Primary Examiner.*

C. DITLOW, *Assistant Examiner.*